United States Patent [19]

Romann

[11] Patent Number: 4,733,822

[45] Date of Patent: Mar. 29, 1988

[54] FUEL INJECTION VALVE WITH COMPENSATION SPRING

[75] Inventor: Peter Romann, Stuttgart, Fed. Rep. of Germany

[73] Assignee: Robert Bosch GmbH, Stuttgart, Fed. Rep. of Germany

[21] Appl. No.: 860,935

[22] Filed: May 8, 1986

[30] Foreign Application Priority Data

Jun. 21, 1985 [DE] Fed. Rep. of Germany ....... 3522225

[51] Int. Cl.[4] ........................ F16K 31/06; F02M 51/06

[52] U.S. Cl. ................................................... 239/585

[58] Field of Search .................. 239/585; 251/129.16, 251/129.17

[56] References Cited

U.S. PATENT DOCUMENTS 4,179,069 12/1979 Knapp et al. .................. 239/585 X
4,365,747 12/1982 Knapp et al. ...................... 239/585
4,455,982 6/1984 Hafner et al. .................. 239/585 X

FOREIGN PATENT DOCUMENTS 2343243 11/1972 Fed. Rep. of Germany ...... 239/585

*Primary Examiner*—Andres Kashnikow
*Assistant Examiner*—Mary Beth Jones
*Attorney, Agent, or Firm*—Edwin E. Greigg

[57] ABSTRACT

An electromagnetically actuatable valve is proposed, in particular a fuel injection valve for fuel injection systems in internal combustion engines, which by using a resilient element between a valve housing and a collar of a spacer ring exerts a long-lasting pressure upon a guide diaphragm that radially guides a valve element. In this manner, an exact fixation of the valve element on a valve seat when the valve is closed is assured even if long-term strain on the injection valve results in a slight loosening between a nozzle holder that includes the valve seat and the valve housing.

3 Claims, 5 Drawing Figures

FUEL INJECTION VALVE WITH COMPENSATION SPRING

BACKGROUND OF THE INVENTION

The invention is based on a fuel injection valve as generally defined hereinafter. From German Offenlegungsschrift No. 29 36 425, a fuel injection valve is already known, which by the use of an elastic element disposed between the valve housing and the valve seat holder assures exact centering of the valve body and valve seat despite settling of the connection between the housing and seat holder resulting from the unavoidable long-term strain it must undergo. However, it has proved to be disadvantageous that when assembling the valve the seat holder must be guided against a stop that behaves elastically. On the one hand, this precludes accurate assembly from one fit to the next, and on the other hand there is the danger that the seat holder will be tilted when it is installed in the valve housing. This can cause radial shifting of the valve body relative to the valve seat, resulting in leakage losses when the valve is closed.

OBJECT AND SUMMARY OF THE INVENTION

The fuel injection valve according to the invention has the advantage over the prior art that assembly of the valve seat holder on the valve housing is simpler and more reliable. The consequences of settling in the connection between the valve seat holder and the valve housing are diminished to the extent that radial shifting is precluded between the valve body and the valve seat, despite long-term strain on the injection valve.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
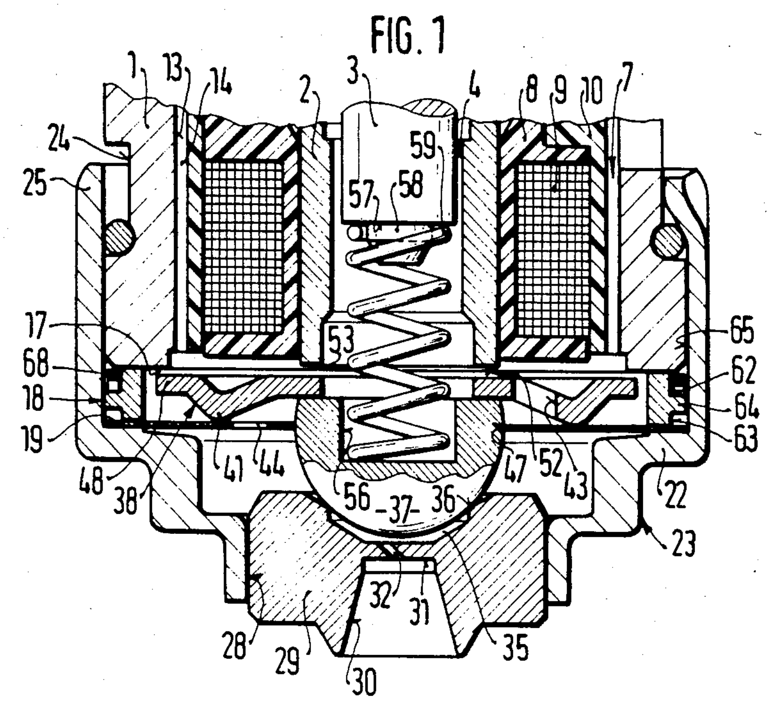
FIG. 1 shows in cross-section the portion of a fuel injection valve according to the invention associated with the air intake tract of an internal combustion engine.

The fuel injection valve for a fuel injection system which is shown by way of example in FIG. 1 serves for instance to inject fuel into the intake tube of mixture-compressing internal combustion engines with externally supplied ignition. A liner 2 of ferromagnetic material is secured in a cylindrical, ferromagnetic valve housing and simultaneously acts as the core of the magnetic injection valve. A cylinder 3 is positioned within the liner 2 and is guided inside the liner 2 in the portion of the valve that is not shown. Between the cylinder 3 and the liner 2 there is an annular gap 4, through which the fuel flow enters. An insulating holder body 8 is mounted on the outside diameter of the liner 2, in the interior 7 of the valve housing 1 between the liner 2 and the valve housing 1; the holder body 8 at least partly surrounds a magnetic coil 9 disposed coaxially with the valve housing 1 and liner 2. The holder body 8 and magnetic coil 9 are surrounded by an insulator 10 and are secured on the valve housing 1 by means of a peg, not shown but made of the same material as the insulator 10. Inside the element, and again not shown in the drawing, there is an electric connection line leading to the magnetic coil 9. An annular gap 14, which serves to carry away excess fuel, is left between the outside diameter of the insulator 10 and the housing bore 13 surrounding the interior 7 of the valve housing 1. A spacer ring 18 rests on the end face 17 of the valve housing 1 oriented toward the intake tract of the engine, and the spacer ring 18 is adjoined by a guide diaphragm 19. The other side of the guide diaphragm 19 is engaged by a shoulder 22 of a nozzle holder 23, which partly surrounds the valve housing 1 and is crimped at end 25 into a groove 24 in the valve housing 1, thereby exerting an axial clamping force for the positional fixation of the spacer ring 18 and guide diaphragm 19. Remote from the valve housing 1, the nozzle holder 23 has a coaxial receiving bore 28, into which a nozzle body 29 is inserted and secured, for instance by welding or soldering. The nozzle body 29 has a preferably frustoconical preparation bore 30 opening in the direction remote from the valve, and at least one fuel guide bore 32 which serves to meter fuel discharges at the bottom 31 of the preparation bore 30. The fuel guide bores 32 begin at a spherical chamber 35 formed in the nozzle body 23, upstream of which a circular valve seat 36 is formed in the nozzle body 29; with a valve element 37 of hemispherical shape being arranged to cooperate with the valve seat 36.

Remote from the valve seat 36, the valve element 37 is connected to a relatively flat armature 38. The flat armature 38 has an integral annular guide ring 41, which is raised and rests on the side of the guide diaphragm 19 remote from the valve seat 36. Flow openings 43 in the flat armature 38 and flow apertures 44 in the guide diaphragm 19 enable an unhindered flow of fuel around the flat armature 38 and the guide diaphragm 19. The guide diaphragm 19, which is fastened integral with the housing on its outer circumference, between the spacer ring 18 and the shoulder 22 of the nozzle holder 23, has a centering opening 47, through which the movable valve element 37 protrudes and by which this element is guided in the radial direction. The fastening of the guide diaphragm 19 integral with the housing between the spacer ring 18 and the shoulder 22 of the nozzle holder 23 is effected in a plane which, when the valve element 37 is resting on the valve seat 36, passes through the center, or as close as possible to the center, of the spherical valve element. By means of the guide diaphragm 19 resting on the guide ring 41 of the flat armature 38, the flat armature 38 is guided as nearly parallel as possible to the end face 17 of the valve housing 1, the flat armature 38 protruding somewhat beyond this end face 17 with an outer magnetic zone 48. A second magnetic zone exists between the end face 52 of the liner 2 and the flat armature 38. When current is flowing through the magnetic coil, the flat armature 38 rests with its outer magnetic zone 48 on the end face 17 of the valve housing 1, while between the flat armature 38 and the end face 52 of the liner 2 a gap 53 remains. A compression spring 59 is supported in an indentation bore 56 in the valve element 37 and on the other end is supported on a step 57 of the cylinder 3, being centered by a protuberance 58 formed on the cylinder 3.

The spacer ring 18 has a recess 62 on its outside diameter, oriented toward the end face 17 of the valve housing 1. A further recess 63 may be provided on the face of the outside diameter of the spacer ring 18 oriented toward the guide diaphragm 19. The recesses 62 and 63 form a collar 64, which simultaneously acts as the outside diameter of the spacer ring 18 and rests in a bore 65 of the nozzle holder 23 that surrounds the valve housing 1. Located in the recess 62, resting on the collar 64 oriented toward the valve housing 1 on the one hand and on the end face 17 of the valve housing 1 on the other, is a washer 68 having an undulatory surface or spring washer 69. The washer 68 having the undulatory surface and spring washer 69 exhibit an elastic behavior, which is oriented in the axial direction of the injection valve.

Figure 2:
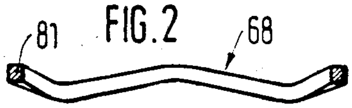
FIGS. 2 and 3 show one embodiment of a resilient element according to the invention.
Figure 4:
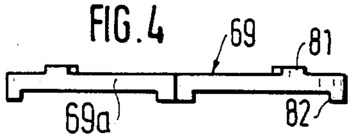
FIGS. 4 and 5 show another embodiment of a resilient element according to the invention.
Figure 3:
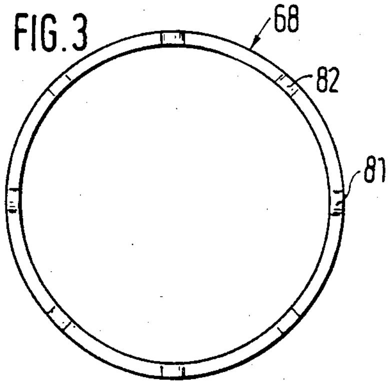
Figure 5:
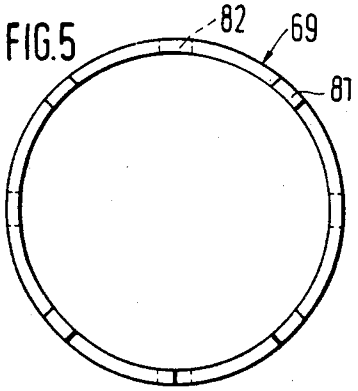

FIGS. 2 and 3 show an exemplary embodiment of the wave washer 68 having the undulatory surface, while FIGS. 4 and 5 show an exemplary embodiment of the spring washer 69. The undulatory washer 68 and spring washer 69 each have raised portions 81 and 82, which rest respectively on the end face 17 of the valve housing 1 and on the collar 64 of the spacer ring 18. In FIGS. 4 and 5, it is seen that the washer comprises a series of alternating oppositely disposed raised portions which are integrally interconnected by flexible zones **69*a***.

In assembling the fuel injection valve, the nozzle holder 23 is guided toward the valve housing 1 until the shoulder 22 of the nozzle holder 23, the guide diaphragm 19, the spacer ring 18 and the end face 17 of the valve housing 1 rest on one another and are thereby clamped together.

Dictated by the force exerted on the valve housing 1 and spacer ring 18 by the undulatory washer 68 or spring washer 69, a pressure on the part of the spacer ring 18 upon the guide diaphragm 19 clamped between the spacer ring 18 and the shoulder 22 of the nozzle holder 23 is then assured, even if a slight relative movement between the valve housing 1 and the nozzle holder 23 takes place due to long-term strain on the injection valve. Thus slippage of the guide diaphragm 19 is no longer possible, and correct positioning of the valve element 37 on the valve seat 36 is assured at all times.

Additionally, the spring element 69 is manufactured from spring-like stock material, the oppositely disposed surfaces of which have alternating raised portions 82 and in which when the material is shaped into an annulus, one side of the raised portion 82 will engage the valve housing while its opposite side is adapted to engage the collar 64 of the spacer ring 18. The opposite ends of the strip material which form the annulus are brought together in abutment, as at 83 and thereafter welded or soldered.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An electromagnetically actuatable valve for fuel injection systems of internal combustion engines, comprising a valve housing of ferromagnetic material having an inner bore with an end face, a nozzle holder clamped to said housing having a portion which surrounds a portion of said housing, said nozzle holder having an inwardly directed step that forms a shoulder opposite said end face of said housing, a core of ferromagnetic material, a magnetic coil attached to said core actuating a valve element cooperating with a valve seat, a flat armature which activates said valve element, a spacer ring having a collar, said spacer ring positioned between said end face of said housing and said shoulder of said nozzle holder, a guide diaphragm having an outer face surface in contact with said spacer ring and said shoulder of said nozzle holder and an inner portion in contact with said flat armature, resilient means positioned to rest between said spacer ring collar and said end face of said valve housing which also engages a bore surface of said nozzle holder means clamped to said housing.

2. An electromagnetically actuatable valve as defined by claim 1, in which said resilient means comprises a washer element having an undulatory surface.

3. An electromagnetically actuatable valve as defined by claim 1, in which said resilient means comprises a series of alternating oppositely disposed raised portions interconnected by flexible zones.

* * * * *